(12) United States Patent
Yeo et al.

(10) Patent No.: US 7,752,519 B2
(45) Date of Patent: Jul. 6, 2010

(54) METHOD FOR CREATING FEEDBACK MESSAGE FOR ARQ IN MOBILE COMMUNICATION SYSTEM

(75) Inventors: Kun-Min Yeo, Daejeon (KR); Chul-Sik Yoon, Daejeon (KR); Jae-Heung Kim, Daejeon (KR); Soon-Yong Lim, Daejeon (KR); Byung-Han Ryu, Daejeon (KR)

(73) Assignees: Electronics and Telecommunications Research Institute (KR); Samsung Electronics Co., Ltd. (KR); KT Corporation (KR); SK Telecom Co., Ltd., KRX; KTFreetel Co., Ltd. (KR); Hanaro Telecom., Inc. (KR)

( * ) Notice: Subject to any disclaimer, the term of this patent is extended or adjusted under 35 U.S.C. 154(b) by 706 days.

(21) Appl. No.: 10/585,051

(22) PCT Filed: Dec. 29, 2004

(86) PCT No.: PCT/KR2004/003510

§ 371 (c)(1),
(2), (4) Date: May 30, 2007

(87) PCT Pub. No.: WO2005/064839

PCT Pub. Date: Jul. 14, 2005

(65) Prior Publication Data

US 2007/0277074 A1 Nov. 29, 2007

(30) Foreign Application Priority Data

Dec. 29, 2003 (KR) .................. 10-2003-0099026
Dec. 27, 2004 (KR) .................. 10-2004-0113343

(51) Int. Cl.
*H04L 1/18* (2006.01)
(52) U.S. Cl. ..................... 714/748; 370/229
(58) Field of Classification Search ............... 714/748; 370/229
See application file for complete search history.

(56) References Cited

U.S. PATENT DOCUMENTS

| 5,151,899 | A | 9/1992 | Thomas et al. |
| 6,505,034 | B1 | 1/2003 | Wellig |
| 6,519,223 | B1 | 2/2003 | Wager et al. |
| 6,526,022 | B1 * | 2/2003 | Chiu et al. .................. 370/229 |
| 6,574,668 | B1 | 6/2003 | Gubbi et al. |

(Continued)

FOREIGN PATENT DOCUMENTS

EP    1 286 491 A1    8/2001

(Continued)

*Primary Examiner*—Esaw T Abraham
(74) *Attorney, Agent, or Firm*—The Farrell Law Firm, LLP

(57) ABSTRACT

Provided is a method for generating a feedback message for ARQ including recording an ACK type in a first field; estimating the last block sequence number of successively ACKed blocks and recording the estimated last block sequence number in a second field; recording the number of groups of successively ACKed blocks after the estimated last block sequence number as the number of ACK MAPs in a third field; recording the startblock sequence number of the respective ACK MAPs in a fourth field; recording the lengths of the respective ACK MAPs in a fifth field corresponding to the recorded start block sequence number; and sending a feedback message including information on the first to the fifth fields.

5 Claims, 16 Drawing Sheets

U.S. PATENT DOCUMENTS

| | | | |
|---|---|---|---|
| 6,772,215 B1 * | 8/2004 | Rathonyi et al. | 709/230 |
| 6,778,558 B2 * | 8/2004 | Balachandran et al. | 370/470 |
| 6,801,512 B1 * | 10/2004 | Cudak et al. | 370/332 |
| 7,339,949 B2 * | 3/2008 | Suzuki et al. | 370/468 |
| 2002/0165973 A1 | 11/2002 | Ben-Yehezkel et al. | |
| 2003/0079169 A1 | 4/2003 | Ho et al. | |
| 2003/0210669 A1 | 11/2003 | Vayanos et al. | |

FOREIGN PATENT DOCUMENTS

| | | |
|---|---|---|
| KR | 1020030004618 | 1/2003 |
| WO | WO 00/57594 | 9/2000 |
| WO | WO 00/60799 | 10/2000 |
| WO | WO 00/62466 | 10/2000 |
| WO | WO 01/37473 | 5/2001 |

* cited by examiner

MAC PDU

FIG.7

| 적용 가능 유효 패턴 | |
|---|---|
| ... 1111 10<u>1</u>1 1111 1111 1111 1xxx xxxx ... | 1: ACK |
| ... 1111 100<u>1</u> 1111 1111 1111 1xxx xxxx ... | 0: NACK |
| ... 1111 1000 <u>1</u>111 1111 1111 1xxx xxxx ... | x: ACK or NACK |
| ... 1111 1000 0<u>1</u>11 1111 1111 1xxx xxxx ... | <u>1</u>: First Cumulative ACK end block |
| ... | <u>1</u>: Second Cumulative ACK start block |
| ... 1111 1000 0000 0000 000<u>1</u> 1xxx xxxx ... | |
| ... 1111 1000 0000 0000 0000 <u>1</u>xxx xxxx ... | |

FIG.8

| Syntax | Size | Notes |
|---|---|---|
| ARQ_feedback_IE (LAST) { | variable | |
| CID | 16 bits | The ID of the connection being referenced. |
| LAST | 1 bit | 0 = More ARQ feedback IE in the list.<br>1 = Last ARQ feedback IE in the list. |
| ACK Type | 2 bits | 0x0 = Selective ACK entry<br>0x1 = Cumulative ACK<br>0x2 = Cumulative with Selective ACK<br>0x3 = Cumlative Bulk ACK |
| BSN | 11 bits | |
| Number of ACK Maps | 2 bits | The field indicates the number of ACK maps:<br>If ACK Type == 01,<br>0x0 = 0, 0x1 = 1, 0x2 = 2, 0x3= 3;<br>Otherwise,<br>0x0 = 1, 0x1 = 2, 0x2 = 3, 0x3= 4. |
| if (ACK Type!= 01) { | | |
| for (i=0; i< Number of ACK Maps + 1; ++i) { | | |
| ACK Map | 16 bits | This field has different format according to ACK Type. See ACK Map. |
| } | | |
| } | | |
| } | | |

FIG.9

| Syntax | Size | Notes |
|---|---|---|
| ACK MAP { | 16 bits | |
| if (ACK Type == 03) { | | |
|     BSN | 11 bits | BSN value indicates that its corresponding block and successive Length blocks have been successfully received. |
|     Length | 5 bits | |
| } | | |
| else { | | |
|     Bit Map | 16 bits | In the Bit Map, 1 means that the corresponding block has been successfully received, and 0 means that the corresponding block has not been successfully received. |
| } | | |
| } | | |

FIG.10

| Syntax | Size | Notes |
| --- | --- | --- |
| ACK MAP { | 16 bits | |
| if (ACK Type == 03) { | | |
| Bulk Type | 3 bits | Bulk Type indicates the ACK/NACK of the corresponding three bulks (1: ACK, 0: NACK):<br>1st bit: ACK/NACK of the first bulk,<br>2nd bit: ACK/NACK of the second bulk,<br>3rd bit: ACK/NACK of the third bulk. |
| First Bulk Length | 5 bits | The number of blocks (or BSNs) in the first bulk. |
| Second Bulk Length | 4 bits | The number of blocks (or BSNs) in the second bulk. |
| Third Bulk Length | 4 bits | The number of blocks (or BSNs) in the third bulk. |
| } | | |
| else { | | |
| Bit Map | 16 bits | In the Bit Map, 1 means that the corresponding block has been successfully received, and 0 means that the corresponding block has not been successfully received. |
| } | | |
| } | | |

FIG.11

| Syntax | Size | Notes |
|---|---|---|
| ACK MAP { | 16 bits | |
| if (ACK Type == 03) { | | |
| Bulk Type | 3 bits | Bulk Type indicates the ACK/NACK of the corresponding three bulks (1: ACK, 0: NACK): $1^{st}$ bit: ACK/NACK of the first bulk, $2^{nd}$ bit: ACK/NACK of the second bulk, $3^{rd}$ bit: ACK/NACK of the third bulk. |
| First Bulk Length | 4 bits | The number of blocks (or BSNs) in the first bulk. |
| Second Bulk Length | 4 bits | The number of blocks (or BSNs) in the second bulk. |
| Third Bulk Length | 4 bits | The number of blocks (or BSNs) in the third bulk. |
| Reserved | 1 bit | |
| } | | |
| else { | | |
| Bit Map | 16 bits | In the Bit Map, 1 means that the corresponding block has been successfully received, and 0 means that the corresponding block has not been successfully received. |
| } | | |
| } | | |

FIG.12

| Syntax | Size | Notes |
|---|---|---|
| ACK MAP { | 16 bits | |
| if (ACK Type == 03) { | | |
|     Bulk Configuration | 1 bit | 0: the number of bulks is 2<br>1: the number of bulks is 3 |
|     If (Bulk Configuration == 0) { | | |
|         Bulk Type | 2 bits | Bulk Type indicates the ACK/NACK of the corresponding three bulks (1: ACK, 0: NACK):<br>$1^{st}$ bit: ACK/NACK of the first bulk,<br>$2^{nd}$ bit: ACK/NACK of the second bulk. |
|         First Bulk Length | 6 bits | The number of blocks (or BSNs) in the first bulk. |
|         Second Bulk Length | 6 bits | The number of blocks (or BSNs) in the second bulk. |
|         Reserved | 1 bits | |
|     } | | |
|     Else if (Bulk Configuration == 1) { | | |
|         Bulk Type | 3 bits | Bulk Type indicates the ACK/NACK of the corresponding three bulks (1: ACK, 0: NACK):<br>$1^{st}$ bit: ACK/NACK of the first bulk,<br>$2^{nd}$ bit: ACK/NACK of the second bulk,<br>$3^{rd}$ bit: ACK/NACK of the third bulk. |
|         First Bulk Length | 4 bits | The number of blocks (or BSNs) in the first bulk. |
|         Second Bulk Length | 4 bits | The number of blocks (or BSNs) in the second bulk. |
|         Third Bulk Length | 4 bits | The number of blocks (or BSNs) in the third bulk. |
|     } | | |
| } | | |
| else { | | |
|     Bit Map | 16 bits | In the Bit Map, 1 means that the corresponding block has been successfully received, and 0 means that the corresponding block has not been successfully received. |
| } | | |
| } | | |

FIG.13

| Syntax | Size | Notes |
|---|---|---|
| ACK MAP { | 16 bits | |
| if (ACK Type == 03) { | | |
| NACK Bulk Length | 4 bits | The number of blocks (or BSNs) in the NCK bulk. |
| ACK Bulk Length | 4 bits | The number of blocks (or BSNs) in the ACK bulk. |
| NACK Bulk Length | 4 bits | The number of blocks (or BSNs) in the NACK bulk. |
| ACK Bulk Lenght | 4 bits | The number of blocks (or BSNs) in the ACK bulk. |
| } | | |
| else { | | |
| Bit Map | 16 bits | In the Bit Map, 1 means that the corresponding block has been successfully received, and 0 means that the corresponding block has not been successfully received. |
| } | | |
| } | | |

FIG.14

| Syntax | Size | Notes |
|---|---|---|
| ACK MAP { | 16 bits | |
| if (ACK Type == 03) { | | |
| Bulk Configuration | 1 bit | 0: the number of bulks is 2<br>1: the number of bulks is 3 |
| If (Bulk Configuration == 0) { | | |
| First Bulk Length | 6 bits | The number of blocks (or BSNs) in the first bulk, the first bulk is always NACK when this ACK MAP is the first entry. |
| Next Bulk Flag | 1 bit | Indicates the ACK/NACK of the next bulk |
| Second Bulk Length | 6 bits | The number of blocks (or BSNs) in the second bulk. |
| Next Bulk Flag | 1 bit | Indicates the ACK/NACK of the next bulk |
| Reserved | 1 bits | |
| } | | |
| Else if (Bulk Configuration == 1) { | | |
| First Bulk Length | 4 bits | The number of blocks (or BSNs) in the first bulk; the first bulk is always NACK when this ACK MAP is the first entry. |
| Next Bulk Flag | 1 bit | Indicates the ACK/NACK of the next bulk |
| Second Bulk Length | 4 bits | The number of blocks (or BSNs) in the second bulk. |
| Next Bulk Flag | 1 bit | Indicates the ACK/NACK of the next bulk |
| Third Bulk Length | 4 bits | The number of blocks (or BSNs) in the third bulk. |
| Next Bulk Flag | 1 bit | Indicates the ACK/NACK of the next bulk |
| } | | |
| } | | |
| else { | | |
| Bit Map | 16 bits | In the Bit Map, 1 means that the corresponding block has been successfully received, and 0 means that the corresponding block has not been successfully received. |
| } | | |
| } | | |

METHOD FOR CREATING FEEDBACK MESSAGE FOR ARQ IN MOBILE COMMUNICATION SYSTEM

PRIORITY

This application claims priority to International Patent Application No. PCT/KR2004/003510 filed on Dec. 29, 2004, which claims priority to Korean Patent Application No. 10-2003-099026 filed in the Korean Intellectual Property Office on Dec. 29, 2003 and Korean Patent Application No. 10-2004-0113343 filed in the Korean Intellectual Property Office on Dec. 27, 2004.

BACKGROUND OF THE INVENTION

1. Field of the Invention

The present invention relates to a method for generating a feedback message and reducing overheads in a wireless portable communication system, and more particularly, it relates to a repeat request algorithm for reducing overhead by using an Automatic Repeat reQuest (ARQ) feedback message in a newly defined ACKnowledgment (ACK) MAP.

2. Description of the Related Art

In a wireless portable Internet system, an ARQ algorithm has been developed to minimize an error rate and enhance error correction in data transmission.

The ARQ algorithm is used as a method for retransmitting a damaged data packet with reference to a feedback message (ACK and Negative ACK (NACK)) of each transmitted data packet or in consideration of timeout when the corresponding feedback message is not received.

FIG. 1 shows a block diagram illustrating an ARQ transmitter and an ARQ receiver.

A transmitter 10 transmits a Protocol Data Unit (PDU) to a receiver according to an ARQ mechanism. The PDU is generated from a Service Data Unit (SDU) that is generated from an upper layer 11 and stored in a buffer 12.

An ARQ receiver 23 transmits a feedback message for ARQ to the transmitter 10. The feedback message for ARQ includes an ACK message or a NACK message according to success or failure of the PDU transmission and is used for error correction in the mobile Internet system.

An ARQ transmitter 13 retransmits the corresponding PDU or transmits a discard message to the ARQ receiver 23 in response to the ACK message or the NACK message.

Hence, the result of ARQ that indicates success or failure of transmission is available for transmitter 10 to analyze data transmission efficiency according to the receiver or a channel quality. Quality of Service (QoS) analysis and scheduling can be achieved by referring to the data transmission efficiency.

FIG. 2 is a diagram illustrating a signal flow according to a conventional ARQ method.

When the transmitter 10 transmits a data packet to the receiver, the receiver sends an ACK message as the feed back message for ARQ to the transmitter after receiving the data packet. The ACK message includes a cumulative ACK message and a selective ACK message, which will be stated later.

The ARQ receiver 23 sends the ACK message to the ARQ transmitter 13 when the ARQ receiver 23 successfully receives the data packet, but the ARQ receiver may fail to receive the data packet when the data packet is lost because of a bad channel quality.

The transmitter may not also receive an ACK message from the ARQ receiver 23 when the ACK message is lost due to the bad channel quality. Once the data packet or the ACK message is lost, it is preferable for the ARQ receiver to discard the corresponding data packet after a predetermined lifetime so that the ARQ transmitter may not infinitely wait for a response or retransmit the data packet.

Conventionally, the ARQ transmitter 13 sends a discard message to the ARQ receiver when the data packet or the ACK message is lost on the channel and therefore the transmitter 10 receives no ACK message for a predetermined lifetime, in step S1.

The ARQ receiver 23 sends a discard response message in response to the discard message, and discards the transmitted data packet in step S2.

FIG. 3 to FIG. 5 respectively show formats of the ARQ feed back message in the wireless portable Internet system.

FIG. 3 shows a selective ACK message.

In FIG. 3, it is assumed that a Medium Access Control (MAC) layer PDU (MAC PDU) containing 12 sequence blocks, is transmitted to the receiver and errors occur in the fourth, seventh, eighth, and twelfth sequence blocks in the wireless portable Internet system. The ARQ receiver sends an ACK MAP as the feed back message for ARQ in response to the transmitted MAC PDU. The ACK MAP maps a receipt success into 1 and a receipt error or failure into 0. The ARQ transmitter receives the ACK MAP and retransmits blocks of sequence numbers which are mapped into 0 to the ARQ receiver.

FIG. 4 shows a cumulative ACK message.

When errors occur in the Block Sequence Numbers (BSNs) 4, 7, 8, and 12 of the MAC PDU as shown in FIG. 3, the ARQ receiver generates a corresponding feedback message for ARQ by recording the first sequence of successive blocks (BSNs 1, 2, and 3) transmitted without an error in the feedback message for ARQ.

The ARQ receiver then sends an ACK to inform that the ARQ receiver successfully received the BSNs 1, 2, and 3, and the ARQ transmitter retransmits the blocks from the BSN 4 to BSN 12 of the MAC PDU as shown in FIG. 4.

FIG. 5 shows a selective and cumulative ACK message.

Although the selective ACK message of FIG. 3 is efficient because it only retransmits the blocks with an error, a data processing time and the size of the ACK MAP are problematically increased. The cumulative ACK message shown in FIG. 4 requires less capacity for the feedback message and provides a very fast data processing time, but increases the size of data to be retransmitted.

In FIG. 5, the ARQ receiver requests retransmission by sending the ARQ transmitter an ACK feedback message containing the successfully received BSNs (BSNs 1, 2, and 3) and an ACK MAP remapped from BSN 4 to BSN 12 by taking advantages of the selective ACK message and the cumulative ACK message.

However, the foregoing feedback message for ARQ is not efficient in the wireless portable Internet system since a sequence of successive blocks forms a PDU, and success or failure of data transmission occurs in each PDU.

In other words, the conventional bitmap-type ACK MAP maps success and failure of each BSN, thereby increasing an overhead.

Therefore, an efficient method for transmitting the feed back message for ARQ without increasing the overhead is needed in the wireless portable Internet system.

SUMMARY OF THE INVENTION

An aspect of the present invention is to provide a method for generating a feedback message and reducing overheads in a wireless portable Internet system.

In one aspect of the present invention, there is provided a method for generating a feedback message for Automatic Repeat reQuest (ARQ). In the method, a) an ACK type is recorded in a first field; b) the last block sequence number of cumulative ACK blocks is determined and recorded in a second field, c) the number of group of successive ACK blocks after the block sequence number determined in b) is recorded in a third field as the number of ACK MAPs, d) start block sequence number of the respective ACK MAPs is recorded in a fourth field, e) lengths of the respective ACK MAPs are recorded in a fifth field by corresponding the lengths to the start block sequence number in d).

In another aspect of the present invention, there is provided a method for generating a feedback message for Automatic Repeat reQuest (ARQ). In the method, a) an ACK type is recorded in a first field, b) the last block sequence number of successive ACK blocks is determined and recorded in a second field, c) the number of groups of the successive ACK blocks or NACK blocks after the block sequence number determined in b) is recorded as the number of bulks in a third field, d) types of the respective bulks are set and recorded, e) lengths of the types of the respective bulks are determined and recorded in a fourth field.

In c), the number of bulks is set by selecting a group from among groups having a predetermined number of bulks.

Bits assigned to bulk lengths of the groups respectively having the predetermined number of bulks are different per group.

According to the present invention, overhead of a conventional ARQ feedback message is reduced while performing an efficient packet retransmission request.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein:

FIG. 7 shows a pattern of ACK/NACK according to an embodiment of the present invention;

FIG. 8 illustrates a configuration of the ARQ feedback message according to an embodiment of the present invention;

FIG. 9 illustrates a configuration of the ACK MAP according to a second embodiment of the present invention;

FIG. 10 illustrates a configuration of an ACK MAP according to another embodiment of the present invention;

FIG. 11 illustrates a configuration of an ACK MAP according to another embodiment of the present invention;

FIG. 12 illustrates a configuration of an ACK MAP according to another embodiment of the present invention;

FIG. 13 illustrates a configuration of an ACK MAP according to another embodiment of the present invention;

FIG. 14 illustrates a configuration of an ACK MAP according to another embodiment of the present invention;

DETAILED DESCRIPTION OF EMBODIMENTS OF THE INVENTION

Figure 1:
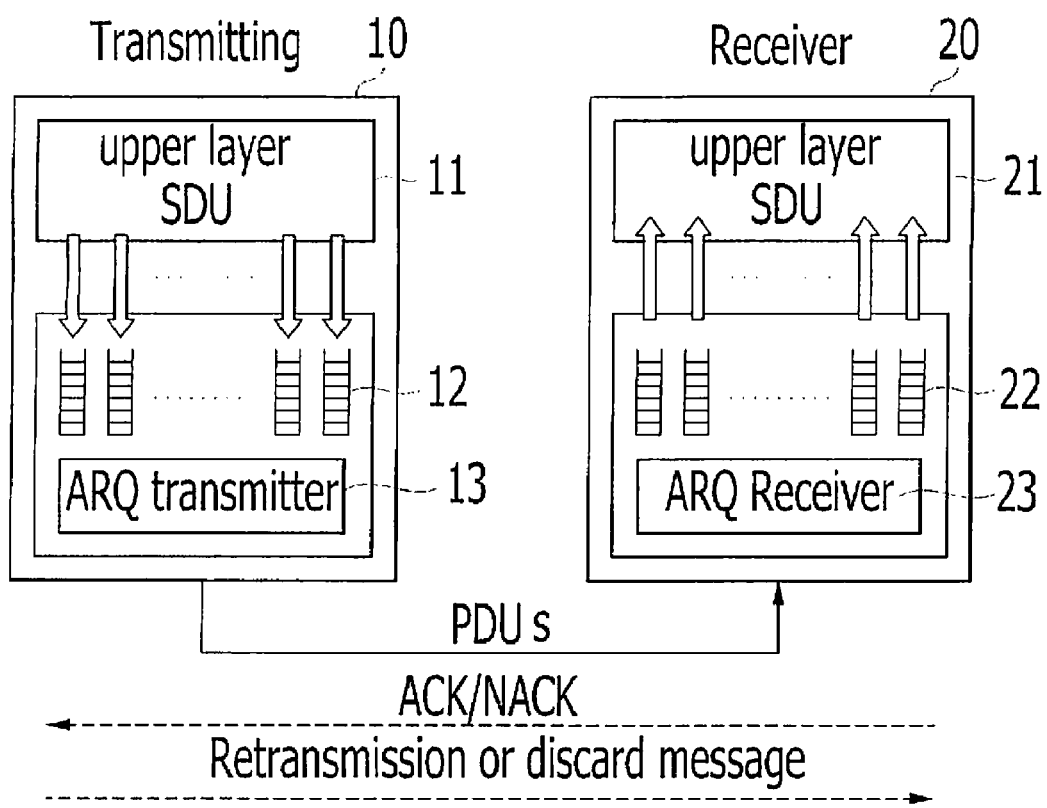
FIG. 1 shows a block diagram illustrating an ARQ transmitter and an ARQ receiver.
Figure 2:
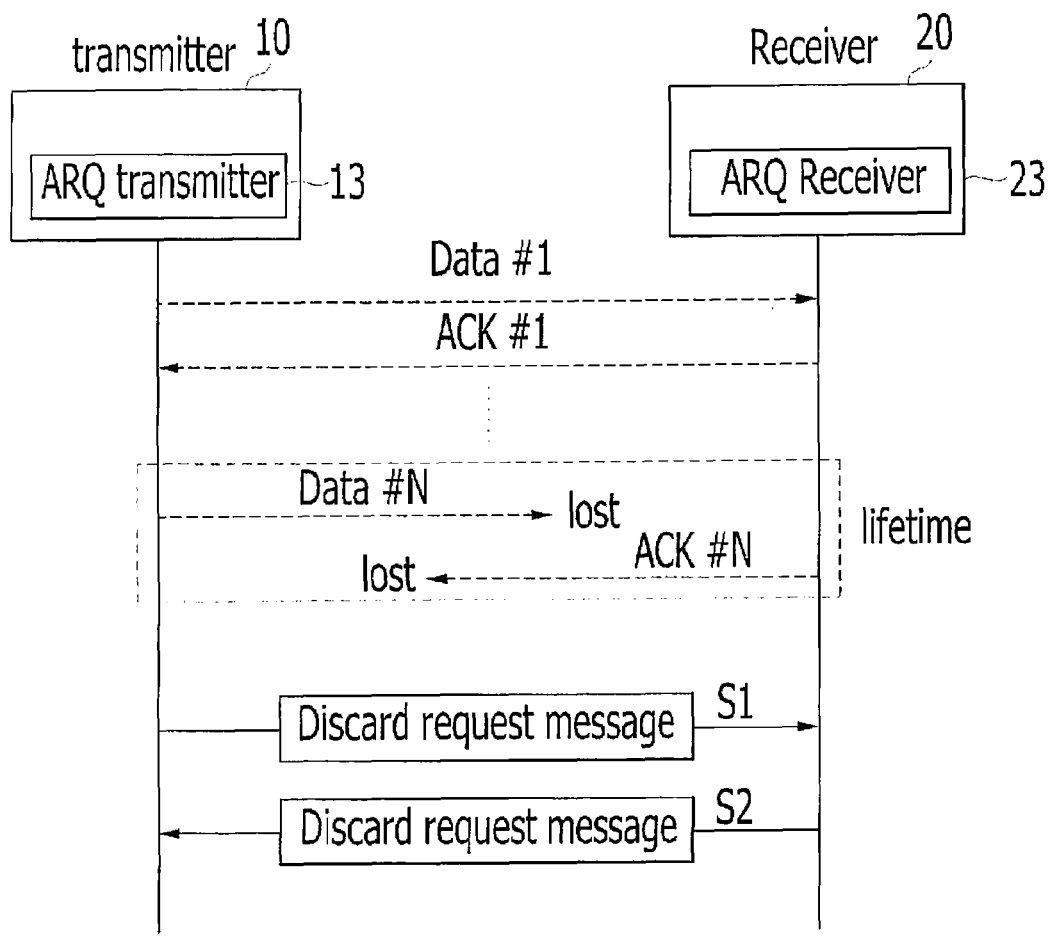
FIG. 2 is a diagram illustrating a signal flow of a conventional ARQ method.

In the following detailed description, embodiments of the invention have been shown and described, simply by way of illustration of the best mode contemplated by the inventor (s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

A method for generating a feedback message for Automatic Repeat reQuest (ARQ) according to an embodiment of the present invention will be described.

Figure 6:
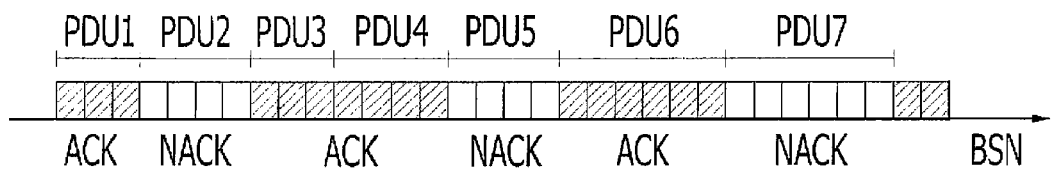
FIG. 6 exemplarily illustrates generating of an ACK or NACK message.

FIG. 6 is a block sequence diagram illustrating a method for generating an ACK message or a NACK message.

A Service Data Unit (SDU) transmitted from an upper layer of a Medium Access Control (MAC) layer is stored in a buffer and the same is transmitted in a format of a Protocol Data Unit (PDU) having a plurality of sequence blocks. Herein, each of the sequence blocks is identified by a Block Sequence Number (BSN). The number of sequence blocks in the PDU varies with respect to time by control of an ARQ receiver. As shown in FIG. 6, success or failure of each transmission may include a number of sequence blocks of related PDUs, sequence blocks in a PDU are regarded as succeeded or failed depending on the success or failure of the corresponding transmission incurred in transmitting the sequence blocks in the wireless portable internet system.

For example, three sequence blocks included in PDU 1 are found to be successfully received, but four sequence blocks in PDU 2 failed to be received.

FIG. 7 illustrates a pattern of the ACK/NACK according to an embodiment of the present invention.

In the pattern, '1' denotes an ACKed sequence block, '0' denotes a NACKed sequence block, 1' denotes the first cumulative ACK end block, and '[1]' denotes the second cumulative ACK start block.

In other words, similar to a typical cumulative ACK message, a first cumulative ACK message indicates successfully received BSNs, and a second cumulative ACK message indicates the second cumulative ACK start block when PDUs after the first cumulative ACK end block is NACKed. In addition, the length of the second cumulative ACK message displays successfully received data.

Therefore, the first BSN and the length of the sequence blocks in the second cumulative ACK message are defined as an ACK MAP according to the embodiment of the present invention.

Figure 3:
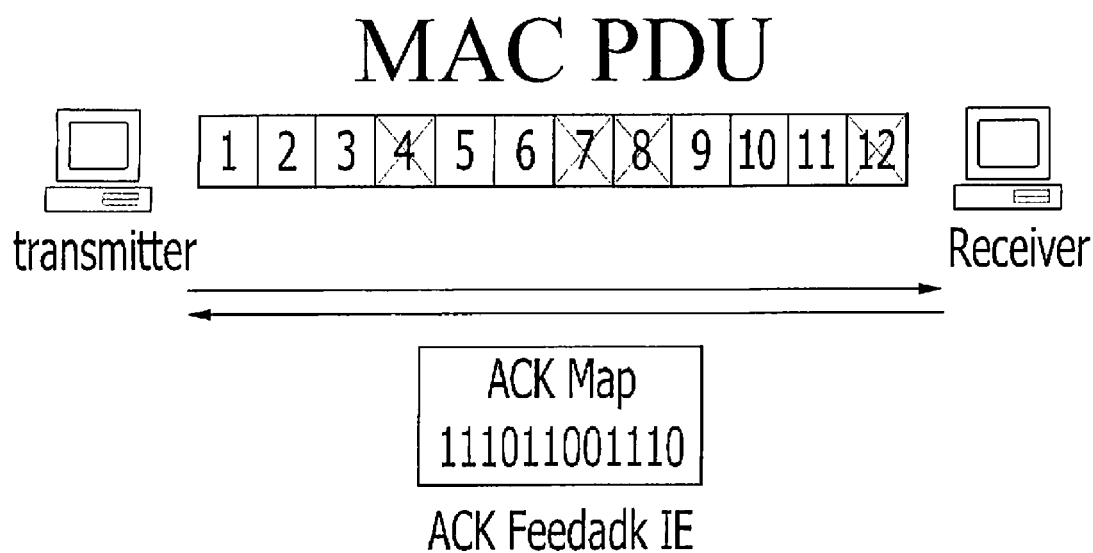
FIG. 3 shows a selective ACK message.
Figure 4:
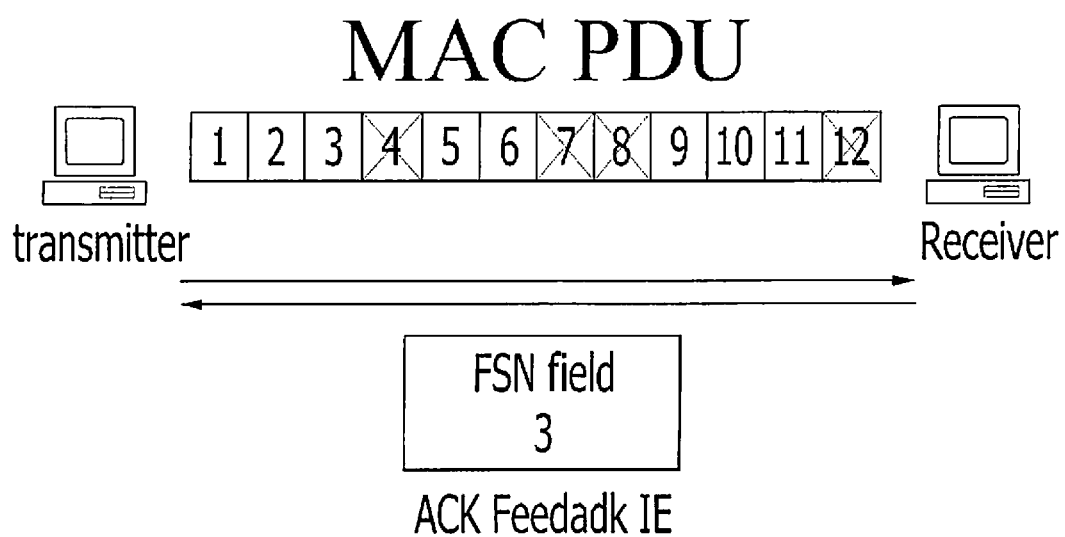
FIG. 4 shows a cumulative ACK message.
Figure 5:
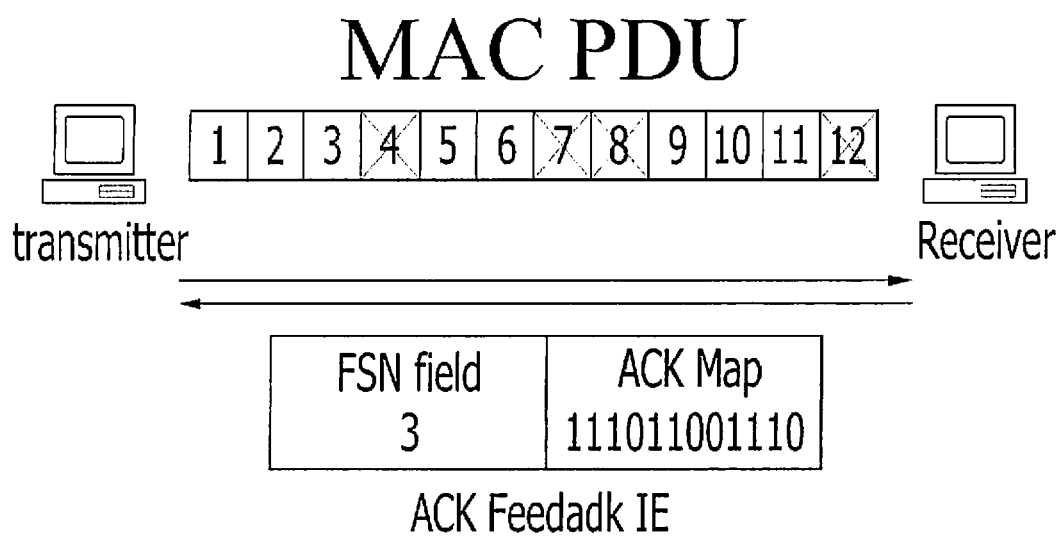
FIG. 5 shows a selective-cumulative ACK message.

To distinguish the ACK MAP from a conventional ACK MAP in FIG. 3 and FIG. 5, the conventional ACK MAP is referred to as a BIT MAP hereinafter.

The BITMAP requires 4 bytes to patternize the ACK/NACK of each block as shown in FIG. 7, whereas the ACK MAP of the present invention requires only 2 bytes, and therefore the feedback message for ARQ incurs lower overhead.

FIG. 8 is a syntax of the ARQ feedback message in conjunction with ACK Map of the present invention. A syntax of the ARQ feedback message includes the following fields: a Connection IDentifier (CID) identifying a MAC connection; a LAST indicating the last feedback message for ARQ in a list; an ACK Type indicating a type of an ACK; a BSN indicating the last BSN in ACKed sequence blocks; a Number of ACK MAPs indicating the number of ACK MAPs; and an ACK MAP providing information on the corresponding ACK MAP.

A connection is defined as a mapping relationship between MAC peers in the wireless portable Internet system. Therefore, the CID includes reference information addressing that a connection is dedicated for a feedback message for ARQ. However, the CID is not needed when a channel is dedicated for the feedback message for ARQ.

The LAST is set to be '0' when the corresponding feedback message for ARQ is not the last one, and set to be '1' when the feedback message for ARQ is the last one.

The ACK Type determines the type of ACK of the feedback message for ARQ. For example, '0' indicates a selective ACK, '1' indicates a cumulative ACK, '2' indicates a cumulative-selective ACK, and '3' indicates a cumulative-bulk ACK. The cumulative-bulk ACK corresponds to the ACK according to the embodiment of the present invention.

The last BSN in the first sequence of blocks that is successfully received is recorded in a BSN field of FIG. 8.

The number of ACK MAPs is recorded in the Number of ACK MAPs. The Number of ACK MAPs may be set to be 1 to 4. When the ACK Type is set to be 1 (that is, a cumulative ACK), the number of ACK MAPs is set to be 0 because no ACK MAP is required.

Information on the ACK MAP is recorded in a unit of 16 bits in the corresponding ACK MAP field.

FIG. 9 illustrates a configuration of the ACK MAP field according to the first embodiment of the present invention.

The ACK MAP field includes 11-bit BSN information and 5-bit Length information. The BSN field of the ACK MAP corresponds to the start BSN of the corresponding successive ACKs with the size indicated by Length. The Length field indicates the number of blocks counted from the BSN of the ACK MAP to the last BSN of successive ACKed blocks.

Meanwhile, a Bit MAP field indicates Bit MAP information of an ACK and NACK message when the ACK type is set to be 0 (selective ACK) or 2 (cumulative-selective ACK).

Therefore, the first cumulative ACK and successive ACKs after the first cumulative ACK may be efficiently transmitted by using the ACK MAP. The ACK MAP includes a start BSN and Length information to thereby reduce overheads of the feedback message for ARQ compared to a conventional ACK using the BIT MAP.

The ACKed blocks are transmitted by using the ACK MAP according to the foregoing embodiment of the present invention, but successive ACKs and NACKs are respectively defined by using different ACK MAPs according to another embodiment of the present invention.

FIG. 10 illustrates a configuration of an ACK MAP according to the second embodiment of the present invention.

An ACK MAP field includes a 3-bit Bulk Type field, a 5-bit Length field of the first bulk, a 4-bit Length field of the second bulk, and a 4-bit Length field of the third bulk.

Herein, a Bulk Type field defines whether the first, second, and third bulks are ACKed or NACKed, respectively. For example, when the Bulk Type field is set to be '010', it informs that the first bulk is NACKed, the second bulk is ACKed, and the third bulk is NACKed.

The respective Length fields of the first to third bulks indicate the number of blocks included in the respective bulks.

FIG. 11 illustrates a configuration of an ACK MAP according to the third embodiment of the present invention.

The configuration of the third embodiment is similar to the second embodiment shown in FIG. 10, except that the Length fields of the first, second, and third bulks are equally assigned 4 bits.

FIG. 12 illustrates a configuration of an ACK MAP according to the fourth embodiment of the present invention.

The BULK Configuration field is used to indicate the number of bulks in the ACK MAP.

For example, when the number of the bulks is 2, the Bulk Configuration field is set to be and the Length fields of the first and second bulks are equally assigned 6 bits.

When the number of the bulks is 3, the Bulk Configuration is set to be 1 and the Length fields of the first, second, and third bulks are equally assigned 4 bits.

Accordingly, the numbers and lengths of bulks may vary depending on various ACK/NACK patterns, thereby efficiently configuring the ACK MAPs.

FIG. 13 illustrates a configuration of an ACK MAP according to the fifth embodiment of the present invention.

According to the fifth embodiment of the present invention, a NACK bulk and an ACK bulk are alternately set in case that a group of sequential ACK blocks and a group of sequential NACK blocks are alternated with each other.

The Length fields of the ACK bulk and the NACK bulk are respectively assigned 4 bits, and they are alternately set to thereby efficiently configure successive ACKs and NACKs.

FIG. 14 illustrates a configuration of an ACK MAP according to the sixth embodiment of the present invention.

As shown therein, the Bulk Configuration field indicates the number of bulks.

Regardless of the Bulk Configuration field, the first bulk is NACKed because a cumulative ACK is already addressed by the BSN in the syntax of the ARQ feedback message as FIG. 8, thus the first bulk is mapped to be NACKed.

The Next Bulk Flag field is assigned 1 bit to thereby indicate whether the following bulk is the ACK or NACK. Herein, '0' indicates a NACKed bulk, and 1' indicates an ACKed bulk.

The configurations of the ACK MAPs illustrated in FIG. 9 to FIG. 14 may be adapted to the ACK field of FIG. 8. In other words, when ACK TYPE=3 (a cumulative-bulk ACK), the ACK MAPs of FIG. 9 to FIG. 14 may be substantially the same as the cumulative-bulk ACK type by using BSN information on the last BSN of the first cumulative ACK and an overhead is reduced by using the ACK MAPs of FIG. 9 to FIG. 13.

The cumulative-bulk ACK type is defined as a new ACK type according to the embodiments of the present invention, but an existing cumulative ACK type (ACK Type=1) may be defined as similar to the cumulative-bulk ACK type according to the embodiment of the present invention.

Figure 15:
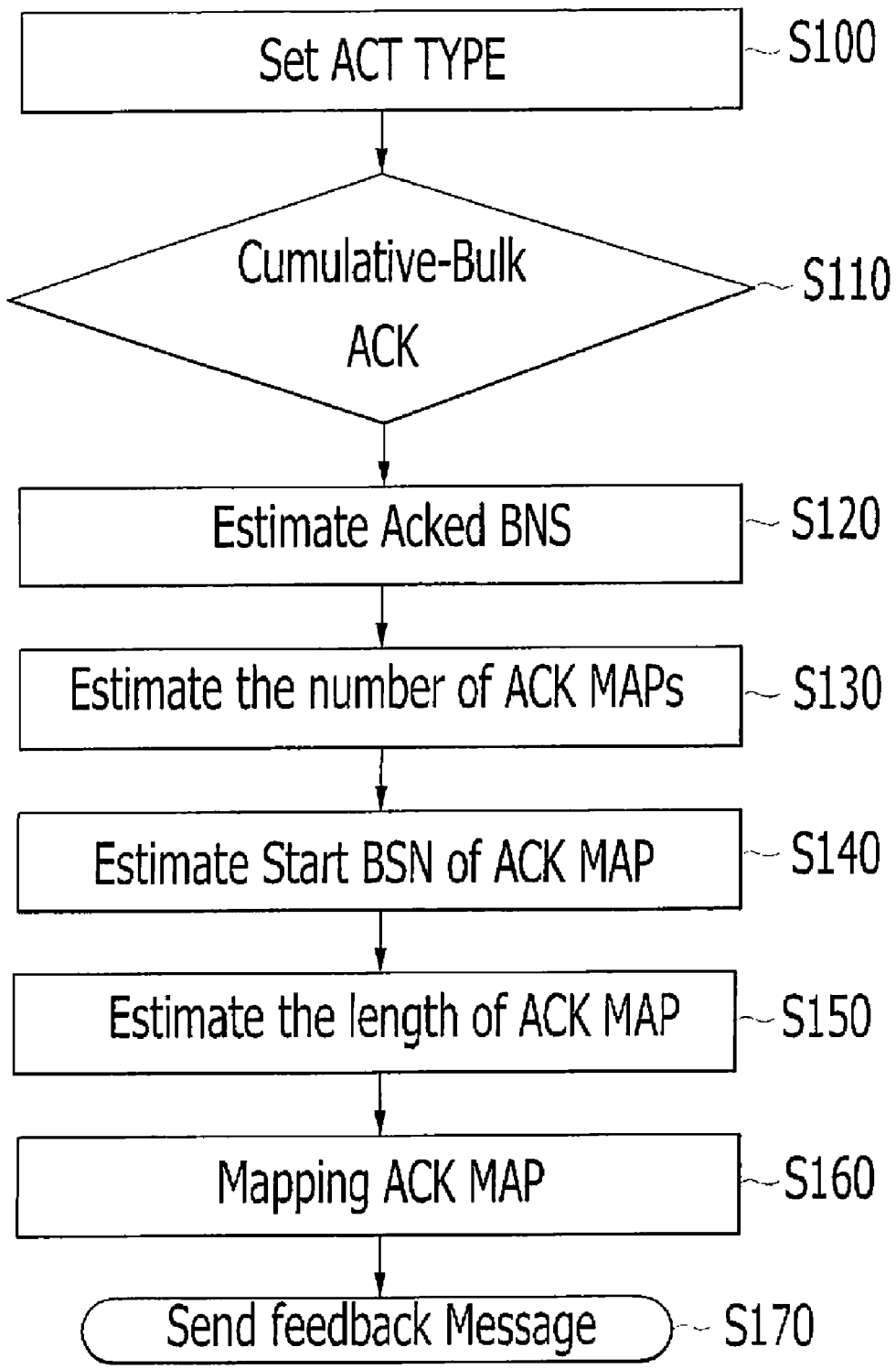
FIG. 15 illustrates a method for generating an ARQ feedback message according to an embodiment of the present invention.

FIG. 15 illustrates a method for generating a feedback message for ARQ according to an embodiment of the present invention.

When the receiver receives PDUs corresponding to a MAC ARQ window and stores the PDUs in a receipt buffer, an ARQ transmitter sets ACK types for the respective PDUs to send corresponding ARQ feedback messages, in step S100.

When the ACK type is set to be a cumulative Bulk ACK in step S110, a value of the first ACKed BSN among the received blocks is determined in step S120. When the first ACKed BSN is not the cumulative Bulk ACK, a conventional ACK process is performed. The first ACKed BSN corresponds to the last BSN of the first successive ACKed blocks.

When a BSN of the first ACKed block is defined, the number of ACK MAPs to be generated in the ARQ window is determined in step S130. The number of ACK MAPs corresponds to the number of bulks of successive ACKed blocks in the ARQ window.

The ARQ transmitter determines a start BSN of the ACK MAPs in step 140. The start BSN is determined by sequentially detecting BSNs corresponding to ACKs after the first cumulative ACK.

The ARQ transmitter determines the length of the respective ACK MAPs in step S150. Lengths of the respective ACK MAPs indicate a total number of blocks counted from the first BSN to the last BSN in the respective ACK MAPs. Each length is mapped in a binary code.

The ACK MAP is generated on the basis of the determined values, and is mapped in a feedback message in step S160. Information on ACKed blocks is included in the feedback message, and blocks which are not successfully received are defined as NACKed blocks.

The ARQ transmitter transmits the feedback message including the ACK MAP and the cumulative ACK to the transmitter for data retransmission in step S170.

A process (not shown) may be included in the method for generating the feedback message of FIG. 15 to detect whether a channel for data retransmission is dedicated, and set a CID value when no channel is dedicated for the feedback message.

Figure 16:
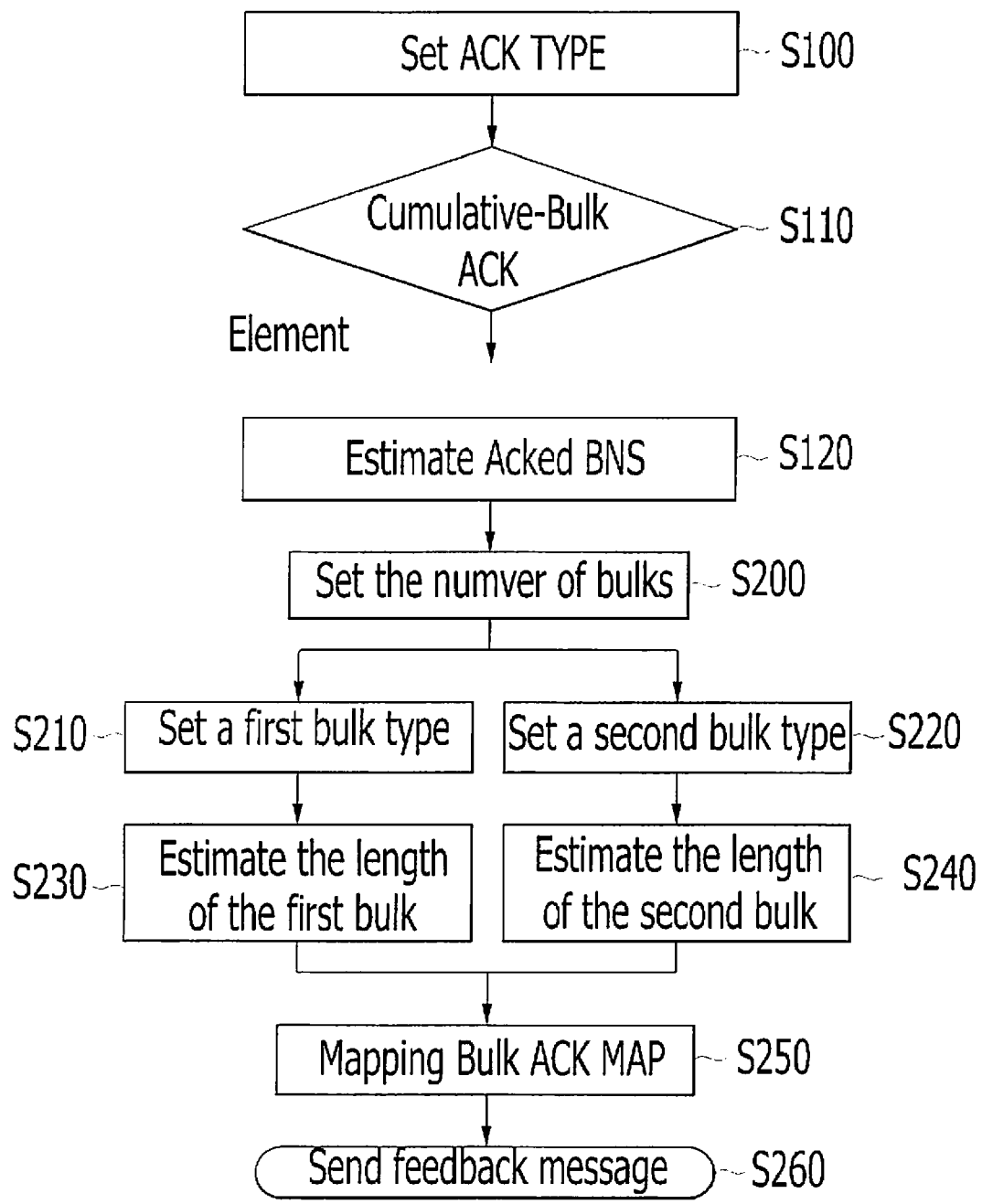
FIG. 16 illustrates a flow of a method for transmitting an ARQ feedback message according to another embodiment of the present invention.

FIG. 16 illustrates a flow of a method for transmitting an ARQ feedback message according to another embodiment of the present invention.

Descriptions for steps S100 to S120 will be omitted since they are similar to those in FIG. 15. After step S120 of FIG. 16, a bulk ACK MAP is generated.

In step S200, the number of bulks to be used in the bulk ACK MAP is set. The number of bulks may be addressed in bits for mapping, or selected by using various options.

As to setting the number of the bulks, the respective bulks may have different bit values for the lengths of the respective bulks.

The number of the bulks may be set to be more than two, but it is set to be a first bulk and a second bulk for ease of description.

In steps S210 and S220, bulk types of the first and second bulks are set. The bulk type determines whether the bulk is ACKed or NACKed. The bulk type may be set corresponding to a plurality of bulks by using an additional field, or may be set to be alternately ACKed and NACKed according to a predefined order. In addition, a Bulk Flag may be used to determine the bulk type of each bulk.

The bulk type of the first bulk is set to be NACK, and the bulk types of from the second bulk are defined by using the Bulk Flag.

The lengths of the first and second bulks are determined and mapped. The number of bits assigned to respectively indicate the lengths of the first and second bulks may be varied depending on the number of the bulks, in steps S230 and S240.

A bulk ACK MAP is generated, and the bulk ACK MAP includes information on the number of the bulks, the bulk type, and the length of the bulks, in step S250.

When the bulk ACK MAP is generated, the bulk ACK MAP is sent as a feedback message together with the ACKed BSN determined in step S120, in step S250.

As described, the method for transmitting a feedback message for ARQ is realized by using the ARQ transmitter and the buffer. In other words, the ACK MAP and the bulk ACK MAP are generated by using conventional cumulative ACK messages for the blocks stored in the buffer and checking bitmaps after the last BSN of the ACKed blocks according to the embodiments of the present invention. A configuration of the conventional cumulative and selective ACK-enabled receiver may be applied to realize the ACK MAP and the bulk ACK MAP, and this application will be appreciated by those skilled in the art.

A program including the foregoing functions is recorded in a readable recording medium for controlling the ARQ receiver.

According to the foregoing configurations of the present invention, overhead of a conventional ARQ feedback message is reduced while performing an efficient packet retransmission request.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

The invention claimed is:

1. A method, performed in a wireless communication system, for sending a feedback message for an automatic repeat request, comprising:

recording an ACK type in a first field, wherein the ACK type indicates one of a selective ACK type, a cumulative ACK type, a cumulative-selective ACK type, and a cumulative-bulk ACK type;

determining a last block sequence number of successive blocks that are successfully received by a first wireless communication device from a second wireless communication device, to record the determined last block sequence number in a second field;

recording, in a third field, types of groups of successive blocks that are successfully or unsuccessfully received after the last block sequence number if the ACK type is the cumulative-bulk ACK type;

determining lengths of the groups to record the determined lengths of the groups in a fourth field if the ACK type is the cumulative-bulk ACK type; and sending, by the first wireless communication device, a feedback message including fields from the first field to the fourth field.

2. A method, performed in a wireless communication system, for sending a feedback message for an automatic repeat request, comprising:

recording an ACK type in a first field, wherein the ACK type indicates one of a selective ACK type, a cumulative ACK type, a cumulative-selective ACK type, and a cumulative-bulk ACK type;

determining a last block sequence number of successive blocks that are successfully received by a first wireless communication device from a second wireless communication device, to record the determined last block sequence number in a second field;

determining a number of ACK maps to record the determined number of the ACK maps in a third field;

if the ACK type is the cumulative-bulk ACK type, recording, in a fourth field of each of the ACK maps, types of the groups of successive blocks that are successfully or unsuccessfully received after the last block sequence number, wherein the types of the groups indicate whether each of the groups is successfully received, and determining lengths of the groups for each of the ACK maps, to record the determined lengths of the groups in a fifth field of each of the ACK maps; and sending, by the first wireless communication device, a feedback message including fields from the first field to the fifth field.

3. A method, performed in a wireless communication system, for sending a feedback message for an automatic repeat request, comprising:
- recording an ACK type in a first field;
- determining a last block sequence number of successive blocks that are successfully received by a first wireless communication device from a second wireless communication device, to record the determined last block sequence number in a second field;
- determining a number of groups of successive blocks that are successfully or unsuccessfully received after the last block sequence number, to record the determined number of groups in a third field;
- recording types of the groups in a fourth field, wherein the types of the groups indicate whether each of the groups is successfully received;
- determining lengths of the groups to record the determined lengths of the groups in a fifth field; and
- sending, by the first wireless communication device, a feedback message including fields from the first field to the fifth field.

4. The method of claim 3, wherein the ACK type indicates one of a selective ACK type, a cumulative ACK type, a cumulative-selective ACK type, and a cumulative-bulk ACK type, and wherein, if the ACK type is the cumulative-bulk ACK type, determining a number of the groups, recording the types of the groups, and determining the lengths of the groups to record the determined lengths of the groups.

5. A method, performed in a wireless communication system, for sending a feedback message for an automatic repeat request, comprising:
- recording an ACK type in a first field, wherein the ACK type indicates one of a selective ACK type, a cumulative ACK type, a cumulative-selective ACK type, and a cumulative-bulk ACK type;
- determining a last block sequence number of successive blocks that are successfully received by a first wireless communication device from a second wireless communication device, to record the last block sequence number in a second field;
- determining a number of ACK maps to record the determined number of the ACK maps in a third field;
- if the ACK type is the cumulative-bulk ACK type, determining a number of groups of successive blocks that are successfully or unsuccessfully received after the last block sequence number, to record information on the determined number of groups for each of the ACK maps in a fourth field of each of the ACK maps, recording types of the groups for each of the ACK maps in a fifth field of each of the ACK maps, wherein the types of the groups indicates whether each of the groups is successfully received, and determining lengths of the groups for each of the ACK maps, to record the determined lengths of the groups in a sixth field of each of the ACK maps; and
- sending, by the first wireless communication device, a feedback message including fields from the first field to the sixth field.

* * * * *